United States Patent [19]

Saxon

[11] 4,440,286

[45] Apr. 3, 1984

[54] ORIENTATING DEVICE

[75] Inventor: John W. C. Saxon, Sawtry, England

[73] Assignee: Avdel Limited, Hertfordshire, England

[21] Appl. No.: 355,216

[22] Filed: Mar. 5, 1982

[30] Foreign Application Priority Data

Mar. 13, 1981 [GB] United Kingdom ............... 8108004

[51] Int. Cl.³ ............................................ B65G 47/24
[52] U.S. Cl. ................................... 198/380; 198/389; 198/391
[58] Field of Search ................ 198/380, 389, 391, 400

[56] References Cited

U.S. PATENT DOCUMENTS

| 2,832,458 | 4/1958 | Ferguson et al. | 198/389 X |
| 3,288,267 | 11/1966 | Taylor et al. | 198/389 X |
| 4,174,028 | 11/1979 | Barnes | 198/389 |

FOREIGN PATENT DOCUMENTS

| 235982 | 4/1975 | Denmark | 198/389 |
| 1384152 | 2/1975 | United Kingdom | 198/380 |
| 2094769 | 9/1982 | United Kingdom | 198/380 |

Primary Examiner—John J. Love
Assistant Examiner—Paul A. Sabel

Attorney, Agent, or Firm—Oblon, Fisher, Spivak, McClelland & Maier

[57] ABSTRACT

A device for orientating components each comprising an axially elongated body extendng unequal distances on opposite sides of a flange. Different components may have the center of gravity on different sides of the flange.

The device comprises a slotted track along which components are fed by vibration, the slot being too narrow to pass the flange. A component is supported on the track by its flange about which it can pivot while on the first portion 28 of the track. A second portion 29 of the track can be entered only by a component orientated perpendicularly of the track with its longer part extending into the slot.

The orientating device includes two air jets 38 and 39, one overlying each part of the track and spaced apart along the track by rather more than the length of one component. A component positioned on the track with its flange at the end of the first portion 28 adjacent the second portion 29 can have only its longer part acted on by one of the air jets, so as to urge the longer part into the slot and the component into the orientation in which it can enter the second portion 29 of the track.

3 Claims, 11 Drawing Figures

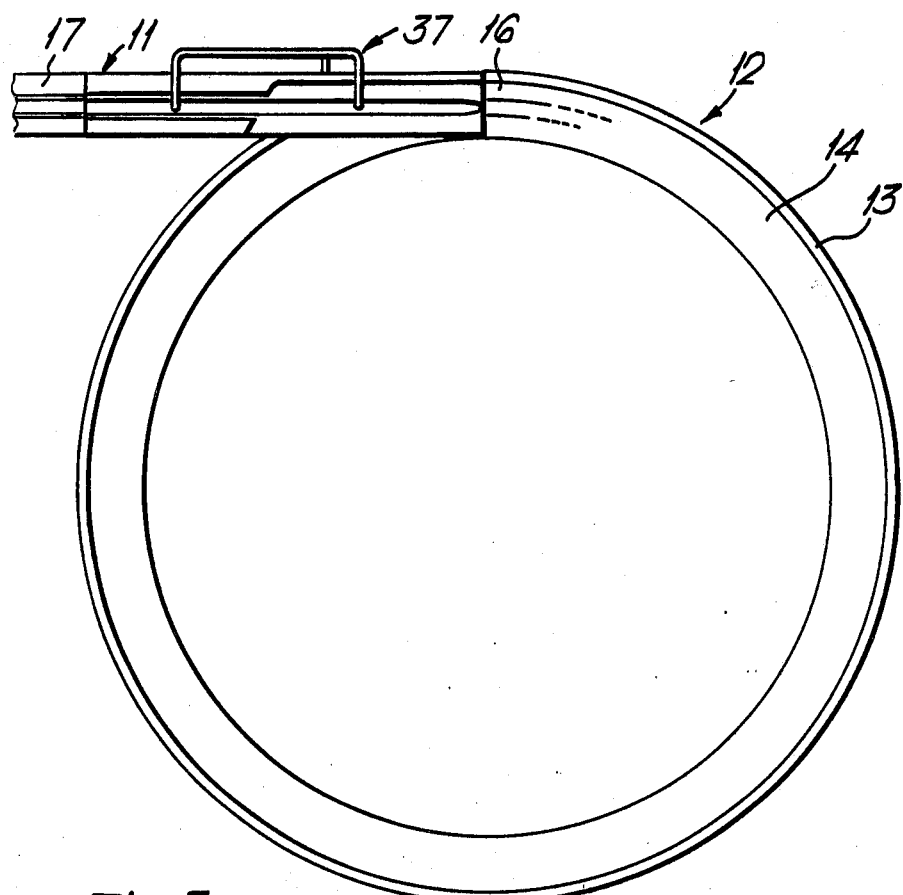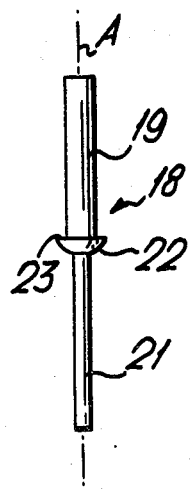

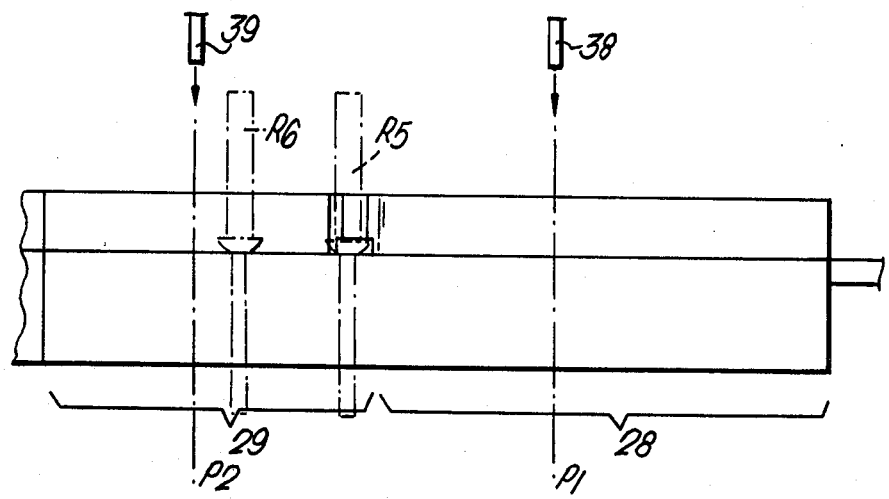
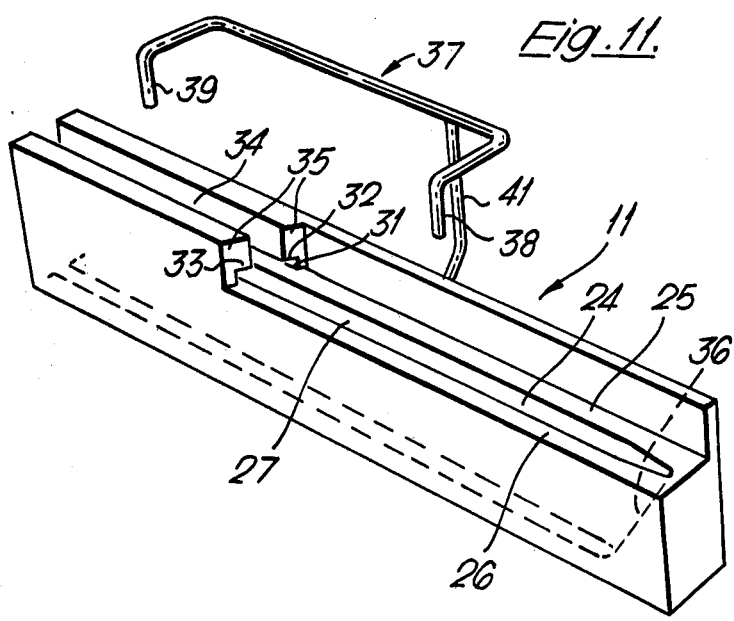

ORIENTATING DEVICE

The invention relates to an orientating device for elongated components. The particular type of elongated component for which this orientating device is intended comprises an axially elongated body extending on both sides of a transversely extending abutment, the first part of the elongated body on one side of the abutment having a maximum transverse dimension greater than those of the second part of the elongated body on the other side of the abutment but not greater than that of the abutment. The transversely extending abutment may be provided by a flange which is of greater transverse dimension than that of either of the two parts of the body. Alternatively, the abutment may be provided by a shoulder forming the end of the first part of the body adjacent the second part of the body, so that the transverse dimension of the abutment is the same as the transverse dimension of the first part of the body.

The invention provides, in one of its aspects, an orientating device for orientating a component comprising an axially elongated body extending on both sides of a transversely extending abutment, the first part of the elongated body on one side of the abutment having a maximum transverse dimension greater than that of the second part of the elongated body on the other side of the abutment but not greater than that of the abutment, which orientating device comprises:

a slotted track along which the component is fed, the slot being so dimensioned as to pass the second part of the component body but not to pass the first part of the body nor the abutment, whereby the component can pivot about the position of engagement of the abutment with the track;

and air blast means arranged to urge the component to pivot as aforesaid so that the second part of the component body enters the slot, whereby the component can take up a desired orientation substantially transverse to the track with the second part of the component body entering into the slot;

which air blast means comprises two air jets arranged so as to act successively on a component fed along the track at two positions spaced apart along the track, whereby when a component of total axial length less than the distance apart of the two positions is fed along the track, the component can be acted on by only one of the air jets at any one time.

When the orientating device is intended for orientating a component in which one of the body parts is longer in axial extent away from the abutment than is the other part, the orientating device may include abutment stop means situated on the track intermediate the positions of action of the two air jets;

the abutment stop means being so arranged and positioned with respect to the position of action of the two air jets that a component fed along the track and orientated along the track has its movement along the track arrested by the engagement of its abutment with the abutment stop in such a position that, regardless of whether the longer of its body parts is leading or trailing, only the longer of its body parts extends to a position of action of an air jet, whereby that air jet causes the component to pivot about its abutment towards the desired orientation transverse to the track aforesaid.

The abutment stop may be arranged such that when a component reaches the desired orientation the abutment thereof no longer engages the stop, so that the orientated component can be fed past the stop. The part of the track beyond the stop may be arranged to restrain an orientated component entering therein from pivoting out of the desired orientation.

A specific embodiment of the invention will now be described by way of example and with reference to the accompanying drawings, in which:

FIGS. 1 and 2 are a simplified partial cross-section and a plan view respectively of a vibratory bowl-feeder in conjunction with which the orientating device is used;

FIG. 3 is a side view of a component which the device is used to orientate;

FIGS. 8, 9 and 10 are simplified versions of FIG. 4, illustrating various positions of a component as it is acted on by the orientating device; and FIG. 11 is a perspective view of the orientating device.

Figure 1:
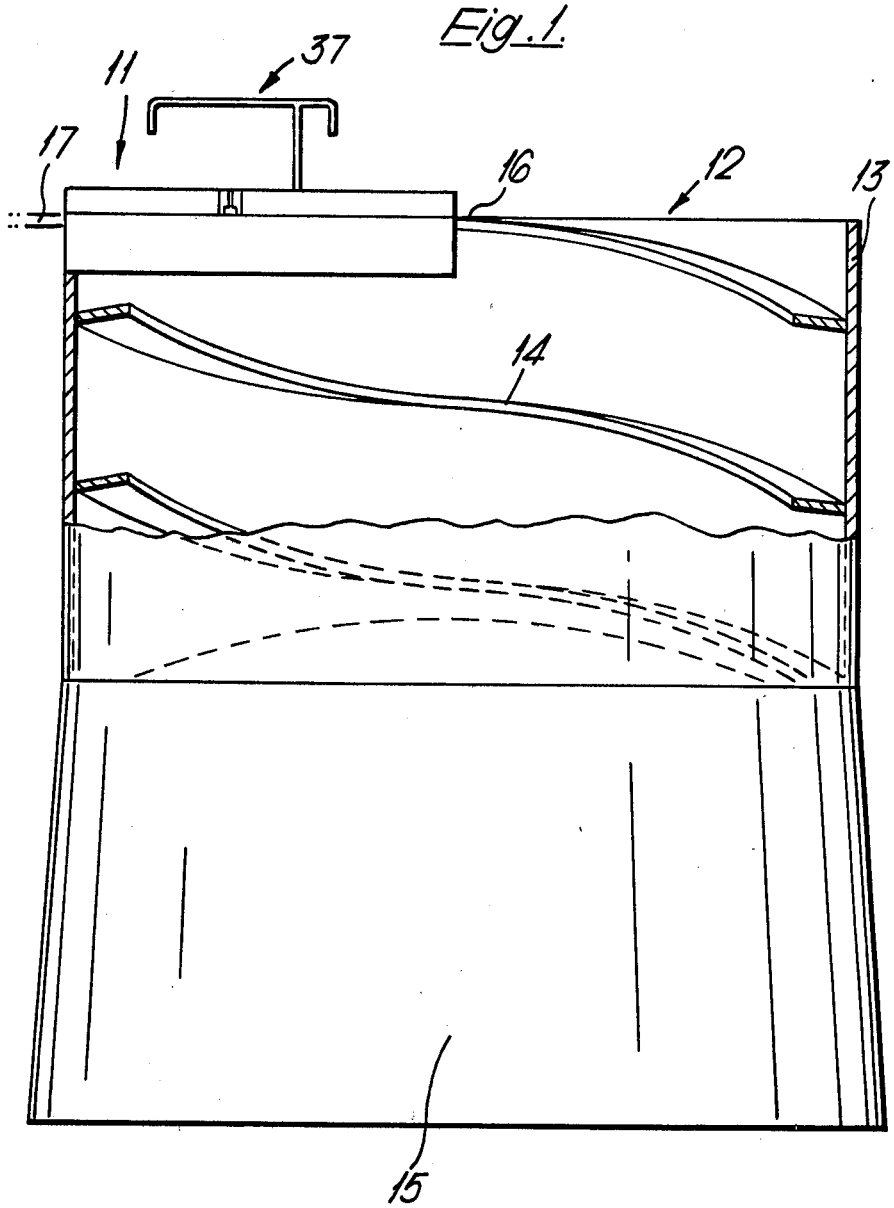

The orientating device of this example is indicated generally at 11 in FIGS. 1 and 2 which show a vibratory bowl-feeder 12 of well known type. It comprises a cylindrical hopper 13 having inside its wall a helical ramp 14. The bowl-feeder is provided with a drive unit inside its base 15 which makes it vibrate cyclically both axially (i.e. up and down) and rotationally. This cyclic movement causes components (not shown in FIGS. 1 and 2) in the bottom of the hopper to climb the helical ramp from the bottom to the top, so that a succession of components is delivered to the top end 16 of the ramp. The orientating device 11 is mounted on and secured to the hopper as a tangential extension of the top ramp 14, so that it vibrates with the hopper, and components are also fed along and through the device. After orientation by the device 11, components continue along a delivery chute or flight 17. Such an arrangement is well know in the art of feeding and orientating components and will not be described further.

The type of component 18 which the orientating device 11 is intended for is illustrated in FIG. 3. It comprises an axially elongated body (having an axis A) having an elongated first part 19 and an elongated second part 21 extending on opposite sides of a transversely extending abutment 22. In this example the component is a blind rivet assembly and has circular or rotational symmetry about the axis A. Each part 19 and 21 is of uniform diameter throughout its length and the diameter of the first part 19 (the head) is greater than that of the second part 21 (the tail). In this example the abutment 22 is provided by one side of a flange 23, the abutment surface 22 being slightly convex to provide a snap-head rivet. The tail 21 is longer than the head 19, so that the tail 21 extends further from the abutment face 22 on one side thereof than the head 19 does from the other side thereof.

Both the head 19 and tail 21 of the rivet are of material (e.g. metal) of the same or similar density. For varieties of rivet of the same head diameter the dimensions of the tail 21 are normally the same (to facilitate use of the same rivet placing tool). However, different rivets are required to secure together different total thicknesses of workpieces, which necessitates providing rivets with heads 19 of different axial lengths. In most sizes it is found that the head 19, although of greater diameter than the tail 21, is sufficiently shorter than the tail 21 that the resultant centre of gravity of the whole rivet assembly lies on the tail-ward side of the abutment face 22. Such rivets will naturally hang tail-downwards when supported in a slotted track in which the slot is wide enough to pass the tail part 21 but not the head part 19 not abutment face 22, and such a slotted track is adequate to provide an orientating device for such components.

However, for rivets for the greatest thickness of workpieces, it is found that the length of the head part 19, although less than the length of the tail part 21, is so great that the centre of gravity of the whole rivet assembly lies slightly on the head-ward side of the abutment face 22. With the particular rivet assemblies in which this orientating device is intended to be used, the position of the centre of gravity is such that the rivet, when supported in such a slotted track, will hang tail-downwards in a position of substantially stable equilibrium. That is to say, if the rivet is deflected from the vertical by pivoting about its abutment face 22 by no more than about 60°, it will return to the vertical position. If the rivet is deflected by more than such an angle, it will tip over and lie in stable equilibrium along the track, supported at the flange and the remote end of the head part. However, provided that a component is brought to an orientation within this angle, and is not pivoting with such momentum as to carry it out outside this angle, the component will move towards and achieve a stable tail-downward orientation. The more difficult problem is that components are fed along the bowl-feeder ramp 14 lying along it, but with random partial orientation as regards whether the head end or the tail end of the component is leading. Thus, it is necessary for the orientating device to act on each component, from its stable equilibrium position parallel to the track, in the appropriate direction to bring it tail-downwards, transverse to the track, which is the desired orientation.

Figure 4:
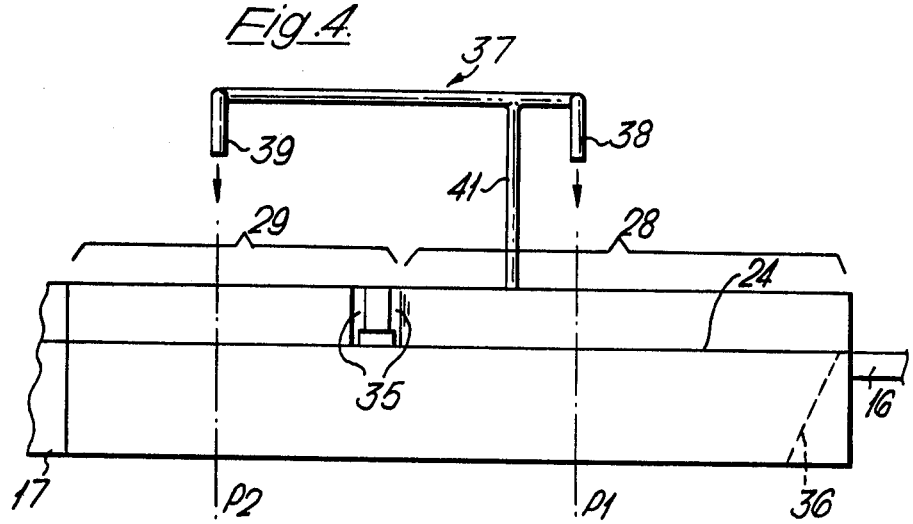
FIG. 4 is a front elevation of the orientating device.
Figure 5:
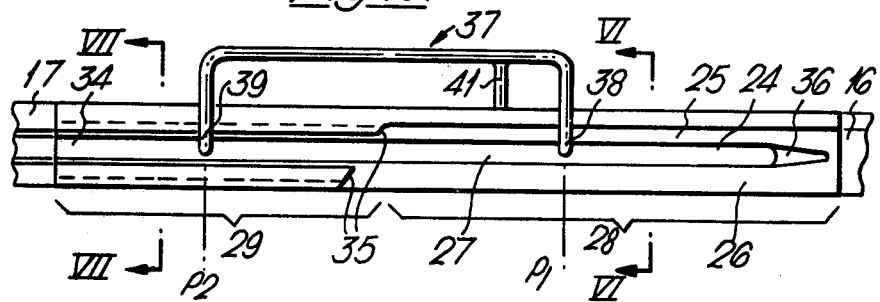
FIG. 5 is a plan view of the device.
Figure 7:
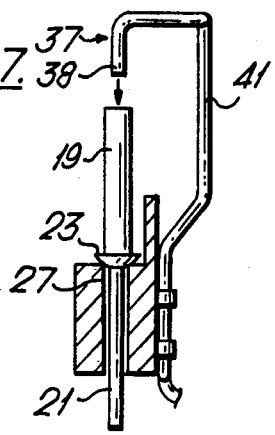
FIGS. 6 and 7 are cross-sections on the lines VI—VI and VII—VII of FIG. 5.
Figure 6:
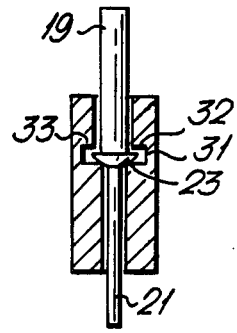
Figure 8:
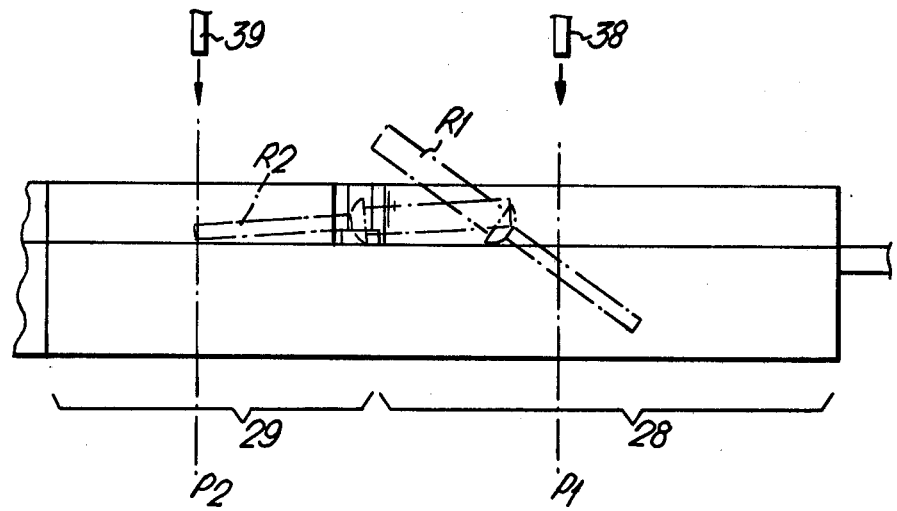
Figure 9:
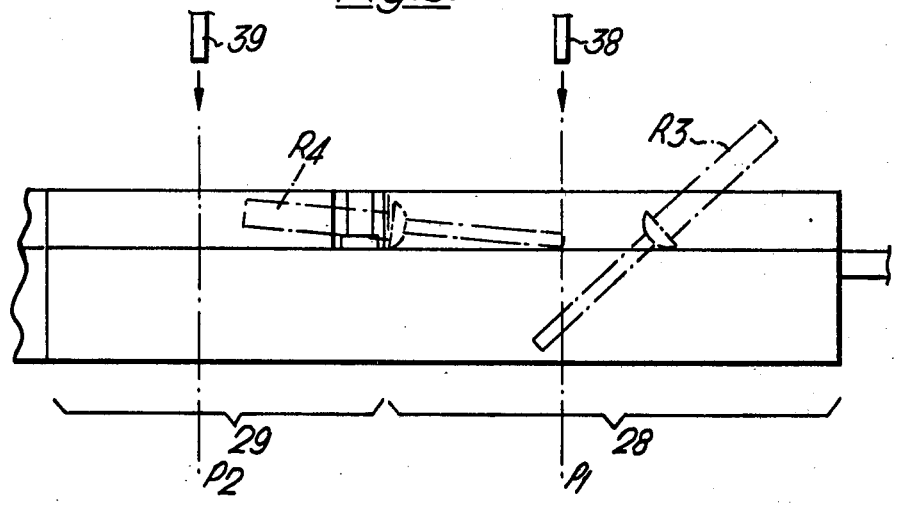

The orientating device of this example comprises a slotted track 24 including two substantially horizontal abutment supporting surfaces 25, 26 separated by a slot 27. The slot 27 is wide enough to pass the tail 21 of a rivet but will not pass the head 19 or abutment 22 thereof. Rivets are fed along the track from right to left as viewed in FIGS. 4 and 5, from the top end 16 of the bowl-feeder ramp, by means of the vibratory movement of the device. The track 24 comprises two portions, a first portion 28, and second portion 29. The first portion 28 has the top of the track open and unrestricted but the second portion 29 has only a shallow gap 31 above the track surfaces 25 and 26, the gap being deep enough to just accomodate the thickness of an abutment flange of a rivet, as illustrated in FIG. 6. The top of the gap 31 is provided by two roof faces 32, 33 which overly the track surfaces 25, 26 respectively, and are separated by upper slot 34 which overlies the slot 27. The upper slot 34 is wider than the slot 27, sufficiently wide to pass the head 19 of a rivet, but not wide enough to pass the abutment flange 23 thereof.

The inner edges of the two track surfaces 25, 26 may be slightly bevelled, to better match the convex shape of the abutment face 22 of the rivet. The right-hand end of the slot 27, which is adjacent the top end 16 of the feeder ramp, is formed with a tapered lead-in 36. In this example, the body of the orientation device is formed from nylon material, which is rigid, easily machined and has low-frictional properties.

The entry end of the second portion 29 of the track provides an abutment stop face 35, which prevents the abutment of a rivet being fed along the track from leaving the first part 28 of the track and entering the second part 29 unless the rivet flange 23 is substantially horizontal, i.e. unless the rivet is orientated transversely to the track, as illustrated in FIG. 6. In this example, the stop face 35 is angled at about 45° to the track, facing towards the inside of the bowl feeder on which the orientating device is mounted.

The orientating device of this example is provided with air blast means 37. This comprises two air jets, a first air jet 38 arranged adjacent the first part 28 of the track and a second air jet 39 arranged adjacent the second part 29 of the track. Each air jet is positioned above the track, at a sufficient distance above it to clear the highest part of a rivet fed along the track in whatever orientation. Each jet is arranged to provide a stram of air downwards towards the track, to impinge on a part of a rivet thereon adjacent the jet so as to urge the rivet to pivot about its abutment. In this example the two air jets are connected to and supported by a common feed pipe 41 which is secured to the body of the orientating device, the inlet end of the pipe 41 being connected to a suitable course of compressed air. The two air jets are arranged so that the first jet 38 impinges on the first part of the track at a position P1, and the second air jet 39 impinges on the track at a position P2, indicated in FIGS. 4 and 5 and 8 to 10.

The distance apart of the two positions P1 and P2 is rather more than the total length of the rivet 18, which is the longest rivet the orientating device is intended to handle. Furthermore, the distance along the track of each position P1 and P2 from the stop face 35 (or more strictly, from the position of that face of the abutment flange 23 of a rivet, lying along the track, which is in contact with the stop face) is less than the distance to the remote end of the tail part 21 of the rivet but greater than the distance to the remote end of the heat part 19 of the rivet. Thus a rivet lying between the two air jets, and in particular in the position described, can be acted on by only one of the air jets, and that one air jet will act on the tail part 21 of the rivet, as illustrated at R2 in FIG. 8 and R4 in FIG. 9. Thus the effect of the air blast means on the rivet will be to urge the tail part 21 of the rivet downwardly into the slot 27, so that the rivet pivots about its abutment towards an orientation in which, under the feeding effect of the vibration of the device, it can enter the second portion 29 of the track, (as illustrated at R5 in FIG. 10). Normally this orientation is achieved before the rivet flange reaches the face 35.

Consider now what happens to a rivet fed into the device, either head first or tail first. If the rivet is fed head first, the head remains in contact with the track whilst it progressively passes the air flow of the first air jet at P1. As soon as the rivet flange 23 has passed P1, the first air flow acts on the tail 21 of the rivet and causes the rivet to pivot about its flange in a clockwise direction, as illustrated at R1 in FIG. 8. The rotational momentum thus imparted to the rivet will be at least sufficient to bring it to its upright substantially stable position. The rivet, under the feeding influence of the vibrations of the device, may by this time have reached the entrance to the second portion 29 of the track (as illustrated at R5 in FIG. 10), and therefore enter the second portion. If the rotational momentum imparted to the rivet by the first air jet is sufficient to rotate it clockwise until its head abuts the track, so that it is in a tail-first position with the head urged down on to the track by the first air jet, the rivet will be fed forwards in this orientation. The tail will enter the second portion 29 of the track and, after the head 19 has passed position P1 and therefore left the influence of the first air jet, the tail end of the rivet will reach position P2 (as illustrated at R2 in FIG. 8) and so come under the influence of the second air jet. This will cause the rivet to pivot in an anti-clockwise direction about its abutment which is in contact with the stop face 35, or nearly so. The continuing feeding effect of the vibrations will feed the rivet into the second portion 29 of the track (as illustrated at R6 in FIG. 10) after the rivet has reached the appropriate position in which it is perpendicularly transverse to the track and its flange can enter the gap 31 (as illustrated at R5 in FIG. 10).

If a rivet is fed tail-first on to the track, the tail will first come under the action of the first air jet 38 at position P1. This will cause the rivet to pivot in an anti-clockwise direction about its abutment flange (as illustrated at R3 in FIG. 9). As in the previous case, this will bring the rivet into a tail-downwards orientation transverse to the track, and if it is adjacent the stop face 35 in this orientation it will pass through and enter the second portion 29 of the track. If the rivet swings right over into the head first position (as illustrated at R4 in FIG. 9), the tail part 21 of the rivet again comes under the action of the first air jet 38 at position P1, which causes it to pivot in a clockwise direction again. The rivet then behaves as described in the previous case.

It will be apparent that, whatever the behaviour of a particular rivet under the action of the first air jet 38 at position P1, at least by the time when the rivet has been fed along the track sufficiently that its flange abuts the stop face 35 at the entrance to the second track portion 29, the air blast means will act on it so as to orientate it (as illustrated at R5 in FIG. 10) in such a way that it can enter the second track portion.

All rivets in the second track portion are thus orientated in the tail downwards position (as illustrated at R6 in FIG. 10). In this orientation they pass out of the track and the orientating device and onwards along the delivery chute 17.

In use of the orientating device, it is found that rivets may stack up in the second track portion, and also in the first track portion, but this does not affect the proper working of the device.

The orientating device will also accept, orientate and deliver rivets, similar to those just described, but which are tail-heavy. As previously mentioned, such rivets hang in the track tail-downwards on their own accord. Although they may be temporarily disturbed by one or other of the air jets, they are nevertheless orientated correctly by the device.

The orientation device of this example will also orientate components, comprising two axially elongated parts with an intermediate flange, with the axially longer parts all orientated in the same direction, even if the longer part is of larger diameter than, or the same diameter as, the short part, no matter on which side of the flange the centre of gravity is located.

The orientating device of this example is simple of construction and operation, having no moving parts. It can, of course, be used to orientate components other than rivets. The invention is not restricted to the details of the foregoing example.

For instance, the operation of the device is not dependent upon the precise method of feeding the components to, and along, the track. Other types of vibratory movement could be used. Alternatively, an air jet could be used to feed components along the track. Again, the track could be inclined slightly to use the force of gravity to feed, or assist in feeding, components. More than one feeding means may be combined as appropriate.

The abutment stop face 35 need not be at an angle to the track (it could, for instance, be perpendicular to the track). However in the alignment described above it acts as a plough to return to the hopper any surplus components which may reach it, e.g. it might be possible for a surplus component to engage flanges with a component fed along the slot and thereby be dragged along the track surface beside the slot.

The orientating device could be modified to operate with components in which the abutment by an annular shoulder of the same diameter as the head part, between two parts of the component, there being no projecting flange. The orientation action of the two air jets in positional relationship to the stop surface would be similar, although the second portion of the track would need modification to deal with a flangeless component.

With a suitable construction of track, it would be possible to arrange the air blast means to act upwardly from underneath the track, thereby orientating components with their longer parts upwards. Again, with a suitable construction of track, the track need not be arranged horizontally.

Instead of the second part of the track beyond the stop face 35, there could be provided a hole down which the correctly orientated component drops, into a delivery tube, along which it moves in an axial direction.

I claim:

1. An orientating device for orientating a component comprising an axially elongated body extending on both sides of a transversely extending abutment, the first part of the elongated body on one side of the abutment having a maximum transverse dimension greater than that of the second part of the elongated body on the other side of the abutment but not greater than that of the abutment and one of the body parts being longer in axial extent away from the abutment than is the other of the body parts; which orientating device comprises:

a slotted track along which the component is fed, the slot being so dimensioned as to pass the second part of the component body but not to pass the first part of the body nor the abutment, whereby the component can pivot about the position of engagement of the abutment with the track;

and air blast means arranged to urge the component to pivot as aforesaid so that the second part of the component body enters the slot, whereby the component can take up a desired orientation substantially transverse to the track with the second part of the component body entering into the slot;

wherein said air blast means comprises two air jets arranged so as to act successively on a component fed along the track at two positions spaced apart along the track, whereby when a component of total axial length less than the distance apart of the two positions is fed along the track, the component can be acted on by only one of the air jets at any one time;

wherein said orientating device also includes abutment stop means situated on the track intermediate the positions of action of the two air jets, the abutment stop means being so arranged and positioned with respect to the positions of action of the two air jets that a component fed along the track and oriented along the track has its movement along the track arrested by the engagement of its abutment with the abutment stop in such a position that, regardless of whether the longer of its body parts is leading or trailing, only the longer of its body parts extends to a position of action of an air jet, whereby that air jet causes the component to pivot about its abutment towards the desired orientation transverse to the aforesaid track.

2. An orientating device as claimed in claim 1, in which the abutment stop is arranged such that when a component reaches the desired orientation the abutment thereof no longer engages the stop, so that the orientated component can be fed past the stop.

3. An orientating device as claimed in claim 2, in which the part of the track beyond the stop is arranged to restrain an orientated component entering therein from pivoting out of the desired orientation.

* * * * *